(12) United States Patent
Maskell

(10) Patent No.: US 8,516,661 B2
(45) Date of Patent: Aug. 27, 2013

(54) RETAINER BAND FOR USE IN FLUID-HANDLING VESSELS

(75) Inventor: Bruce W. Maskell, Castro Valley, CA (US)

(73) Assignee: Zodiac Pool Systems, Inc., Vista, CA (US)

( * ) Notice: Subject to any disclaimer, the term of this patent is extended or adjusted under 35 U.S.C. 154(b) by 275 days.

(21) Appl. No.: 12/432,551

(22) Filed: Apr. 29, 2009

(65) Prior Publication Data
US 2010/0278587 A1    Nov. 4, 2010

(51) Int. Cl.
B65D 63/06    (2006.01)

(52) U.S. Cl.
USPC ................................ 24/23 R; 24/22; 24/23 B

(58) Field of Classification Search
USPC ............ 24/23 W, 703.1, 703.2, 703.3, 703.5, 24/22, 20 W, 21
See application file for complete search history.

(56) References Cited

U.S. PATENT DOCUMENTS

| | | | |
|---|---|---|---|
| 179,698 A | | 7/1876 | Hagar |
| 377,799 A | * | 2/1888 | Cannon .............................. 24/21 |
| 432,248 A | | 7/1890 | Rinman |
| 732,270 A | * | 6/1903 | Bowman ........................... 24/30 |
| 777,840 A | * | 12/1904 | Chaplin ........................ 24/23 W |
| 797,152 A | | 8/1905 | Sheckler |
| 1,271,129 A | * | 7/1918 | Brooks ......................... 24/23 W |
| 1,394,631 A | | 10/1921 | Luschka et al. |
| 1,528,449 A | | 3/1925 | Meyer |
| 1,619,803 A | * | 3/1927 | Behrman ........................... 24/21 |
| 1,748,898 A | | 2/1930 | Peebles |
| 1,781,029 A | * | 11/1930 | McGee .......................... 24/23 W |
| 1,820,020 A | | 8/1931 | Hewitt |
| 2,228,494 A | * | 1/1941 | Wilson ............................. 217/91 |
| 2,284,787 A | | 6/1942 | Winkler |
| 2,315,681 A | | 4/1943 | Weisgerber |
| 2,335,109 A | | 11/1943 | Conery |
| 2,495,667 A | * | 1/1950 | Vizner .......................... 24/593.1 |
| 2,615,397 A | | 10/1952 | Conery |
| 2,662,988 A | | 12/1953 | McKim |
| 2,760,262 A | * | 8/1956 | Homan ........................... 29/513 |
| 2,882,828 A | | 4/1959 | Hinckley |
| 3,091,339 A | | 5/1963 | Marra |

(Continued)

FOREIGN PATENT DOCUMENTS

GB    1372014    10/1974

OTHER PUBLICATIONS

Jandy 2007 Catalog, Filters, Jandy Pool Products, Inc., pp. 23-30.

(Continued)

*Primary Examiner* — Robert J Sandy
*Assistant Examiner* — Michael Lee
(74) *Attorney, Agent, or Firm* — Dorsey & Whitney LLP

(57) ABSTRACT

A connecting mechanism for joining the ends of the retainer band that does not damage the band ends may help prevent separation of the ends as the band is compressed, and corrosion of the band when it is exposed to a chemically-charged environment. A retainer structure for use in a fluid-holding tank comprises a main band body having a first end portion and a second end portion and a connecting member for receiving the first and second end portions so that the main band body forms a loop shape. The connecting member is configured to directly secure the received first and second end portions without deforming the first and second end portions.

18 Claims, 9 Drawing Sheets

(56) References Cited

U.S. PATENT DOCUMENTS

| | | |
|---|---|---|
| 3,178,024 A | 4/1965 | Jacuzzi |
| 3,420,376 A | 1/1969 | Smith |
| 3,429,443 A | 2/1969 | Stern |
| 3,493,116 A | 2/1970 | Edmiston |
| 3,519,135 A | 7/1970 | Lerner |
| 3,581,895 A | 6/1971 | Howard et al. |
| 3,625,365 A | 12/1971 | Armstrong et al. |
| 3,664,768 A | 5/1972 | Mays et al. |
| 3,707,233 A | 12/1972 | Lerner |
| D227,565 S | 7/1973 | Ehret |
| 3,747,768 A | 7/1973 | Barrera |
| 3,767,050 A | 10/1973 | Reiner |
| 3,774,772 A | 11/1973 | Yeths |
| 3,779,387 A | 12/1973 | Day et al. |
| 3,795,320 A | 3/1974 | Ehret |
| 3,828,932 A | 8/1974 | Schneer |
| 3,834,537 A | 9/1974 | Brett |
| D235,143 S | 5/1975 | Ehret |
| 3,911,068 A | 10/1975 | Hamilton |
| 3,929,151 A | 12/1975 | Rubin |
| 3,957,644 A | 5/1976 | Edmonson |
| 3,988,244 A | 10/1976 | Brooks |
| 4,003,835 A | 1/1977 | Johnson |
| 4,043,917 A | 8/1977 | Rowley et al. |
| 4,105,555 A | 8/1978 | Pease |
| 4,127,485 A | 11/1978 | Baker et al. |
| 4,134,836 A | 1/1979 | Rowley et al. |
| 4,169,793 A | 10/1979 | Lockshaw |
| 4,187,179 A | 2/1980 | Harms |
| 4,250,540 A | 2/1981 | Kristofek |
| 4,283,281 A | 8/1981 | Cogan |
| 4,390,425 A | 6/1983 | Tafara et al. |
| 4,537,681 A | 8/1985 | Argiropoulos et al. |
| 4,602,463 A | 7/1986 | Holowaty |
| 4,627,118 A | 12/1986 | Baker |
| 4,657,673 A | 4/1987 | Kessler |
| 4,704,202 A | 11/1987 | Poyner |
| 4,712,812 A | 12/1987 | Weir, III |
| 4,769,052 A | 9/1988 | Kowalski |
| 4,798,670 A | 1/1989 | Treene |
| 4,810,170 A | 3/1989 | Ide |
| 4,822,077 A | 4/1989 | Hendrickson |
| 4,861,466 A | 8/1989 | Leoncavallo et al. |
| 4,869,817 A | 9/1989 | Mendoza et al. |
| 4,894,149 A | 1/1990 | Block |
| 4,923,601 A | 5/1990 | Drori |
| 4,924,069 A | 5/1990 | Giordani |
| 4,931,183 A | 6/1990 | Klein et al. |
| 4,964,609 A | 10/1990 | Tomell |
| 4,997,558 A | 3/1991 | Baker |
| 5,000,488 A | 3/1991 | Albrecht |
| D316,741 S | 5/1991 | Kurth et al. |
| 5,068,033 A | 11/1991 | Tobias et al. |
| 5,087,357 A | 2/1992 | Villa |
| 5,109,575 A * | 5/1992 | Angarola et al. ........... 24/16 PB |
| 5,112,481 A | 5/1992 | Drori |
| 5,188,727 A | 2/1993 | Kurth et al. |
| 5,190,651 A | 3/1993 | Spencer et al. |
| 5,222,525 A | 6/1993 | Munroe |
| 5,240,593 A | 8/1993 | Moredock |
| D342,986 S | 1/1994 | Kurth |
| 5,306,121 A | 4/1994 | Heflin et al. |
| 5,320,752 A | 6/1994 | Clack et al. |
| 5,328,604 A | 7/1994 | Drori |
| 5,375,887 A | 12/1994 | Johnson |
| 5,409,606 A | 4/1995 | Spencer |
| 5,505,847 A | 4/1996 | Yamada et al. |
| 5,524,860 A | 6/1996 | Ives |
| 5,584,998 A | 12/1996 | Teter et al. |
| 5,587,074 A | 12/1996 | Lynch et al. |
| 5,653,831 A | 8/1997 | Spencer |
| 5,656,159 A | 8/1997 | Spencer et al. |
| 5,687,994 A | 11/1997 | Hansen |
| 5,753,071 A | 5/1998 | Spencer |
| 5,762,785 A | 6/1998 | Ruiz |
| 5,882,515 A | 3/1999 | Lacy et al. |
| 5,942,109 A | 8/1999 | Wuebker et al. |
| 5,989,419 A | 11/1999 | Dudley et al. |
| 6,029,942 A | 2/2000 | Daddis, Jr. et al. |
| 6,036,853 A | 3/2000 | Spencer |
| 6,156,213 A | 12/2000 | Dudley et al. |
| 6,258,266 B1 | 7/2001 | Riback et al. |
| 6,280,619 B1 | 8/2001 | Lacy et al. |
| 6,287,466 B1 | 9/2001 | Yassin |
| 6,345,558 B1 | 2/2002 | Wilson |
| 6,450,782 B1 | 9/2002 | Sakamoto |
| 6,554,939 B1 | 4/2003 | Murphy |
| 6,582,613 B2 | 6/2003 | Mooneyham |
| 6,605,211 B1 | 8/2003 | Slopack |
| 6,797,164 B2 | 9/2004 | Leaverton |
| 6,874,641 B2 | 4/2005 | Clary |
| 7,022,230 B2 | 4/2006 | Imai et al. |
| 7,081,200 B2 | 7/2006 | Planas Valls |
| 7,093,721 B2 | 8/2006 | Imanse et al. |
| 7,097,766 B2 | 8/2006 | Moya |
| 7,207,604 B2 | 4/2007 | Wilson |
| 7,294,262 B2 | 11/2007 | Tadlock |
| 7,794,591 B2 | 9/2010 | Nibler et al. |
| 7,815,796 B2 | 10/2010 | Nibler et al. |
| 7,951,293 B2 | 5/2011 | Nibler et al. |
| 2004/0057845 A1 | 3/2004 | Skinner |
| 2005/0002800 A1 | 1/2005 | Kimura et al. |
| 2005/0158185 A1 | 7/2005 | Herrick et al. |
| 2006/0124527 A1 | 6/2006 | Goodwin et al. |
| 2007/0045163 A1 | 3/2007 | Meincke et al. |
| 2007/0056903 A1 | 3/2007 | James |
| 2007/0163929 A1 | 7/2007 | Stiles, Jr. et al. |
| 2007/0227959 A1 | 10/2007 | Sinur et al. |
| 2008/0230454 A1 | 9/2008 | Nibler et al. |
| 2008/0230455 A1 | 9/2008 | Nibler et al. |
| 2011/0062068 A1 | 3/2011 | Nibler et al. |
| 2011/0089094 A1 | 4/2011 | Nibler et al. |

OTHER PUBLICATIONS

Jandy 2007 Catalog, Filter Parts, Jandy Pool Products, Inc., pp. 31-41.
Jandy 2008 Catalog, Filters, Jandy Pool Products, Inc., pp. 23-31.
Jandy 2008 Catalog, Filter Parts, Jandy Pool Products, Inc., pp. 32-44.
Jandy 2009 Catalog, Filters, Jandy Pool Products, Inc. pp. 38 pages.
Office Action dated Nov. 18, 2009, Australia Patent Application No. 2008201362, 3 pages.
Office Action dated Jul. 30, 2010, Canada Patent Application No. 2,627,178, 3 pages.
Office Action dated Dec. 13, 2011, Canada Patent Application No. 2,672,838, 4 pages.
Office action dated Oct. 26, 2012, Canada Patent Application No. 2,672,838, 3 pages.

* cited by examiner

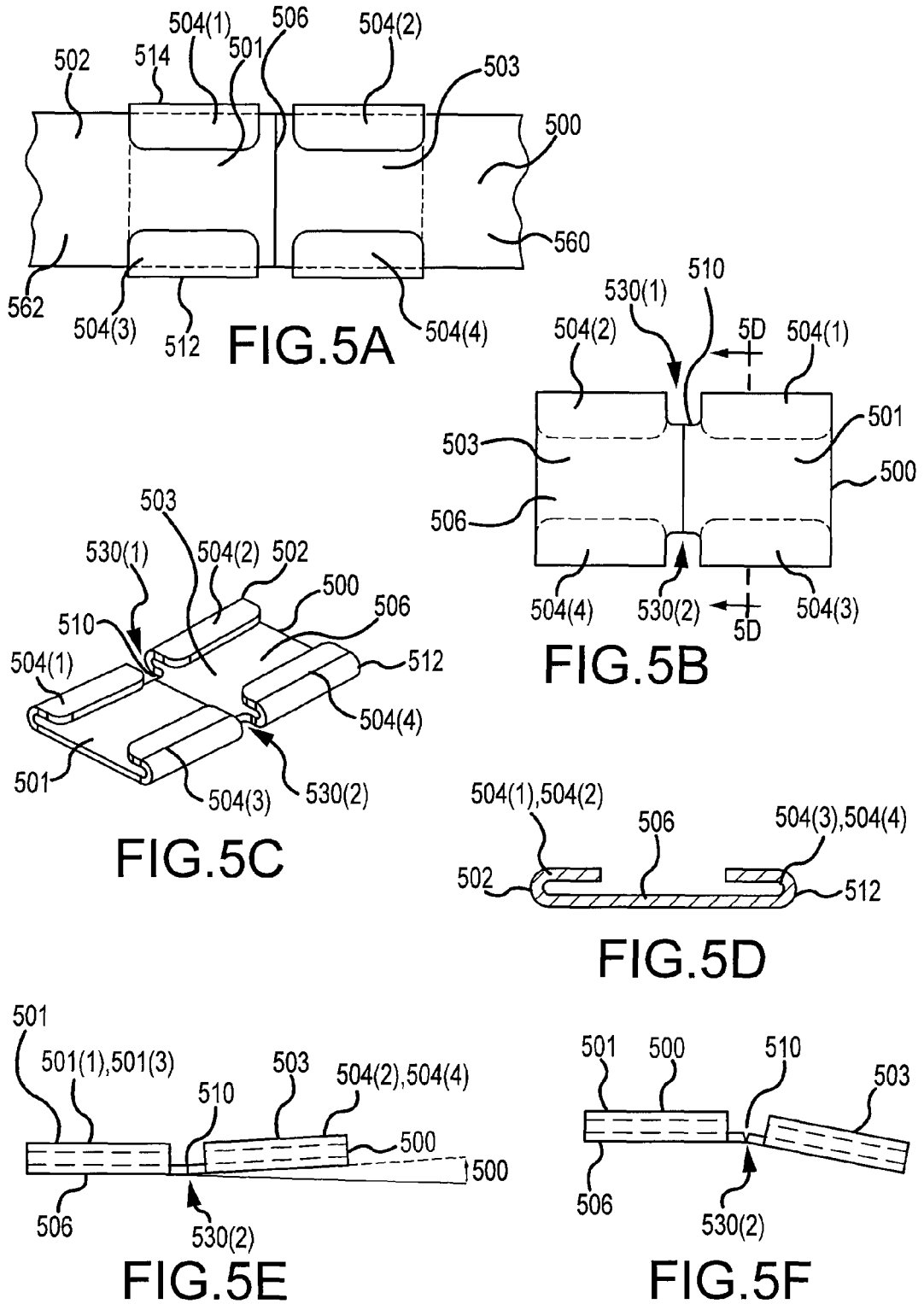

RETAINER BAND FOR USE IN FLUID-HANDLING VESSELS

BACKGROUND

1. Technical Field

The present disclosure relates generally to retainer structures for use in fluid-handling vessels, such as swimming pool filter tanks.

2. Description of Related Art

Fluid-handling vessels, such as water filter tanks, are often separable into top and bottom components to facilitate cleaning of the interior contents of the tank. Many filter tanks include a clamping assembly at the sealing area to prevent separation of the top and bottom tank components during operation. The clamping assembly can be configured as a plastic clamping band that encircles the exterior surface of the tank at the sealing area. Typically, the clamping band can be tightened around the tank to compress a contained elastomeric seal so as to create a water- and air-tight seal at the sealing area. However, this process subjects the components surrounding the sealing area to a large compressive force, and can eventually lead to leaking due to deformation or creeping of the tank at the sealing area.

A retainer structure is commonly used inside a pool filter tank to prevent deformation or creeping of the tank components at the sealing area, thereby ensuring adequate sealing engagement for leak reduction or prevention during operation. Typically, the retainer structure is configured as a strip of stainless steel formed into a closed loop that encircles the interior surface of the band at the seal. Although the clamping band can be periodically loosened, removed, replaced, and/or retightened as the filter tank is serviced throughout its lifetime, the retainer structure may never be removed from around the inside of the tank.

In existing systems, the ends of the strip of metal forming the retainer structure are joined by either riveting or welding one end to another, or by riveting or welding a joining plate to the ends. However, these joining methods often lead to rapid corrosion and erosion of the structure due to the chemicals used in pool fluids. The retainer structures are further prone to breakage because the compressive stresses exerted on the structure are concentrated at the weakened joint portion of the structure.

SUMMARY

A connecting mechanism for receiving the ends of a retainer band that does not damage the ends of the band may help prevent separation of the ends as the band is compressed and from the effects of its environment. Such a structure avoids the problems of the prior art by eliminating the need for riveting or welding to secure the ends of the retainer band.

Embodiments of retainer structures for use in a fluid-holding tank are described herein. In one embodiment, the retainer structure comprises a main band body having a first end portion and a second end portion and a connecting member for receiving the first and second end portions so that the main band body forms a loop shape. The connecting member is configured to directly secure the received first and second end portions without deforming the first and second end portions, e.g., without riveting or welding.

In other embodiments, the main band body can be a strip of metal and the connecting member can be manufactured from a metal, for example, stainless steel. In another embodiment, the connecting member can be plastic.

In some examples, the connecting member directly secures the received first and second end portions in a close fit or a friction fit. Additionally, the connecting member can be a sleeve structure defining a slot having a first open end and a second open end, and the first end portion can be slidably received through the first open end of the slot and the second end portion can be slidably received through the second open end of the slot. Further, the received first and second end portions can be in physical contact within the sleeve structure. In another embodiment, the sleeve structure can have an exterior surface and an interior surface, and at least one of the exterior surface and the interior surface can be substantially smooth. In further embodiments, the interior surface of the sleeve structure can have at least one stop for preventing physical contact between the first and second end portions in the sleeve structure.

In one embodiment, the sleeve structure can have an exterior surface and an interior surface, and at least one of the exterior surface and the interior surface can be textured. In other embodiments, the interior surface of the sleeve structure can have raised ridge portions for preventing sliding of the received first and second end portions in the sleeve structure.

In further embodiments, the first and second end portions can be received so that a first edge of the first end portion and a second edge of the second end portion both line a top edge of the slot, and a third edge of the first end portion distal from the first edge and a fourth edge of the second end portion distal from the second edge line a bottom edge of the slot. The top edge of the slot can be parallel to the bottom edge of the slot, and a distance from the bottom edge of the slot to the top edge of the slot may be approximately equal to a distance from the first edge to the third edge of the first end portion and a distance from the second edge to the fourth edge of the second end portion. In another example, the first and second end portions may each have a constricted portion and one or more shoulders that engage with the sleeve structure to prevent the sleeve structure from sliding past the constricted portion as the retainer structure is compressed.

In another example, the connecting member comprises a back portion having a first edge and a second edge that is parallel to the first edge. A first guiding bracket extends from at least a portion of the first received edge of the back portion, and a second guiding bracket extends from at least a portion of the second edge of the back portion. The first guiding bracket and the second guiding bracket face one another to define a first opening for slidably receiving the first and second end portions along a first surface of the back portion.

In some examples, the back portion is bendable at a hinged portion along an axis perpendicular to the first and second edges of the back portion. Alternatively, the first surface of the back portion may have at least one stop for preventing physical contact between the first and second end portions. Further, the hinged portion may prevent the first and second end portions from sliding past the hinged portion as the retainer structure is compressed. The retainer structure may be configured so as to line a portion of the interior surface of the tank.

In another embodiment, the retainer band may comprise a metal band body having a first end portion, a second end portion, and an engagement structure on the first end portion configured to engage the second end portion so as to directly secure the first end portion to the second end portion without deforming the first and second end portions. The metal band body may form a closed loop upon engagement of the first and second end portions.

In some examples, the second end portion is secured in the engagement structure of the first end portion by a close fit or a friction fit. In other examples, the engagement structure may further comprise a back portion having a first edge and a second edge that is parallel to the first edge. A first guiding bracket may extend from at least a portion of the first edge of the back portion, and a second guiding bracket may extend from at least a portion of the second edge of the back portion. The first guiding bracket and the second guiding bracket face one another to define an opening for slidably receiving the second end portion along a first surface of the back portion.

In further embodiments, the first surface of the back portion can be smooth or textured. In addition, the second end portion may define a constricted portion and one or more shoulders that engage with the engagement structure and prevent the first end portion from sliding past the constricted portion of the second end portion as the retainer structure is compressed. In alternative embodiments, the first end portion can define a slot and the second end portion can comprise a protruding tongue portion for insertion into the slot. In still further embodiments, the retainer structure can be configured so as to line a portion of the interior surface of the tank.

BRIEF DESCRIPTION OF THE FIGURES

FIG. 5A is an enlarged rear elevation view of the connecting member depicted in FIG. 4C.

FIG. 5B is a front elevation view of the connecting member shown in FIG. 5A.

FIG. 5C is an isometric view of the connecting member shown in FIG. 5A.

FIG. 5D is a side elevation view in cross section of the connecting member shown in FIG. 5A along line 5D-5D.

FIG. 5E is a side elevation view of an alternative configuration of the connecting member shown in FIG. 5A.

FIG. 5F is a side elevation view of another alternative configuration of the connecting member shown in FIG. 5A.

DETAILED DESCRIPTION

Described herein are embodiments of retainer structures used in fluid tanks in pool environments. The retainer structure generally has a main body portion that is formed from a strip of metal with two free ends. The retainer structure also generally includes a connecting mechanism, which can be a separate connecting member, or piece, that receives the ends and secures the ends in place so that the main body forms a generally loop shape. The connecting member secures the received ends without deforming the ends. In other embodiments, the ends of the strip can be configured to interlock, so that an additional connecting member is not needed to secure the ends of the strip.

Figure 1:
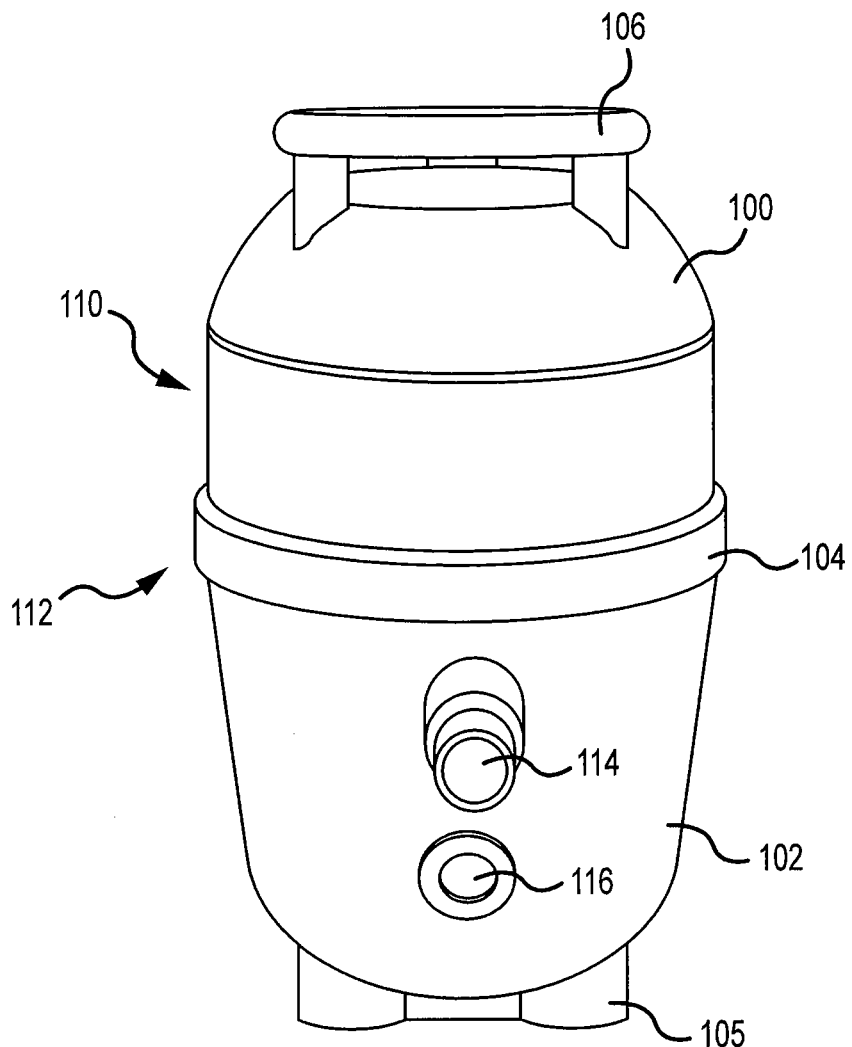
FIG. 1 is a front elevation view of an unseparated filter tank.

In one implementation, as described herein, the retainer structure may be used in a fluid-holding tank, such as a water filter tank used in a pool system. Referring generally to FIG. 1, the water filter tank 110 can include a top half portion 100 and a bottom half portion 102 that are connected by a clamping assembly 104 for preventing separation of the top 100 and bottom 102 half portions of the water filter tank 110 at the sealing area 112. As illustrated in FIG. 1, the top half portion 100 of the water filter tank 110 can include a handle 106 for facilitating removal of the top half portion 100 of the tank 110 for servicing. In addition, the bottom half portion 102 of the water filter tank 110 can include a base portion 105 for resting the tank on the ground in a stable upright position.

As is known in the art, when a pump connected with the water filter tank 110 is turned on, water is drawn in through a water inlet 114 and through a filter medium inside the filter tank 110. The water is strained through the filter medium, and then is pushed out the tank outlet 116 and back into the pool. FIG. 1 illustrates only one particular tank configuration. In other variations, the location and function of the water inlet 114 and the tank outlet 116 may vary.

The water filter tank 110 can be formed from a plastic material, but can also be formed from any non-porous material, such as metal. An elastomeric sealant may be applied between the top half portion 100 and the bottom half portion 102 of the water filter tank 110 to effect a seal at the sealing area 112 as the clamping assembly 104 is tightened around the tank 110.

The clamping assembly 104 can encircle the exterior surface of water filter tank 110 at the sealing area 112. The clamping assembly 104 can be adjusted, for example, by tightening, so as to create a water- and air-tight seal at the sealing area 112 for preventing water or air from entering or escaping the tank 110 at the sealing area 112. The clamping assembly 104 is typically constructed from a metallic material, but may also be made from other suitable materials, such as a durable plastic.

Figure 2:
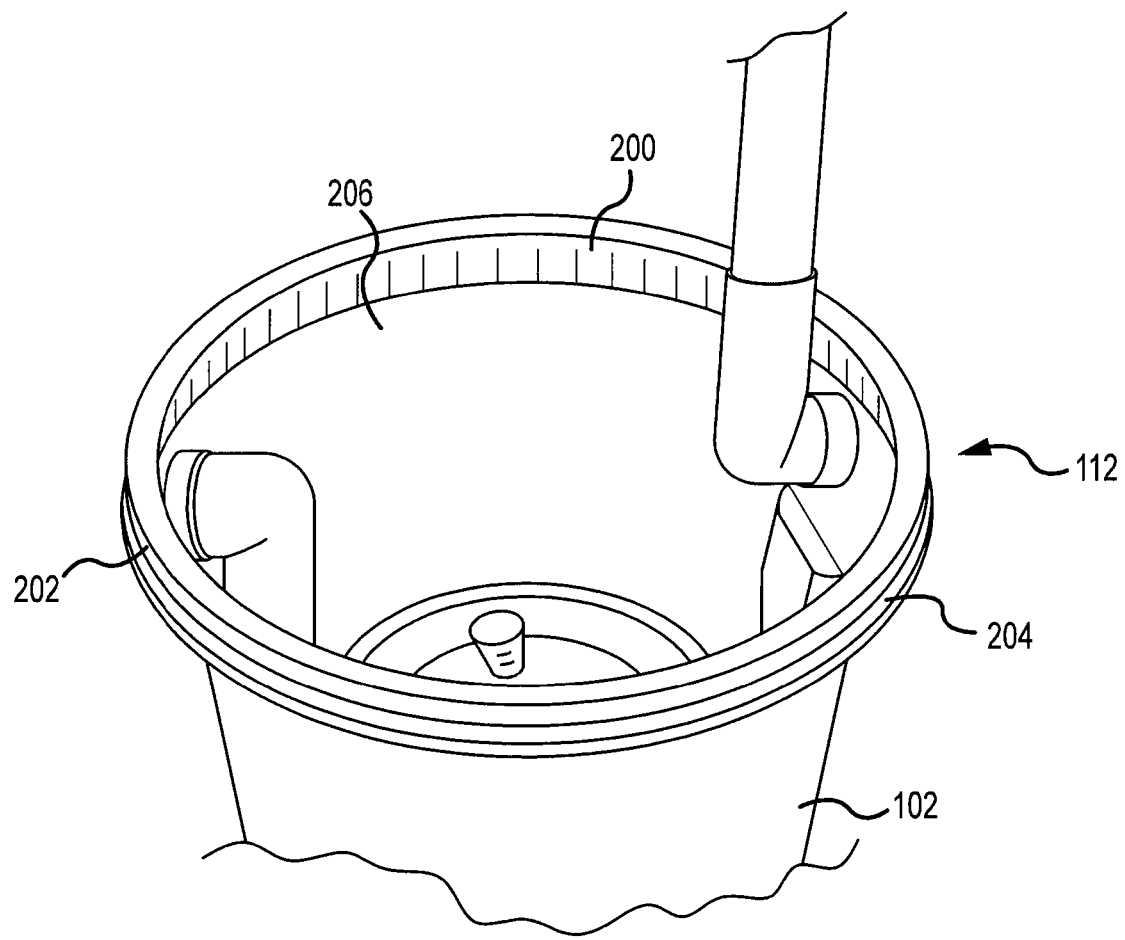
FIG. 2 is a top isometric view of the interior of the bottom half of the filter tank shown in FIG. 1.

FIG. 2 illustrates a top isometric view of the bottom half portion 102 of the filter tank 110 illustrated in FIG. 1, with the top half portion 100 removed to show a retainer band 200 in place in the tank 110. In many filter assemblies, the rim 202 of the bottom half portion 102 and the rim (not shown) of top half portion 100 of the filter tank 110 are shaped to contain an elastomeric seal or O-ring 204 so as to provide a seal to prevent air from entering, or fluid from leaving, the tank 110. In alternative embodiments, the rim 202 of the bottom 102 half portion and the rim of the top half portion 100 can be lined with a waterproof elastomer material at the point of contact between the rim 202 of the bottom half portion 102 of the tank 110 and the rim (not shown) of the top half portion 100 of the filter tank 110, to ensure a tight seal between the tank halves 102 and 100. In other embodiments, the lining may include an O-ring 204 that can be glued-fitted within, or otherwise secured to or captured by the rim 202 of the bottom half portion 102 of the filter tank 110, or to the rim of the top half portion 100. The O-ring seal 204 can have a circular (or other shape) cross section, and may be made from an elastomer material, such as rubber.

The retainer band 200 can be positioned in the bottom half portion 102 of the filter tank 110 so as to line the inside surface 206 of the tank 110. The retainer band 200 may serve to reinforce the plastic tank material and thereby prevent the tank 110 from deforming due to the tightening of the clamping assembly 104 (as shown in FIG. 1) around the sealing area 112. Typically, the band 200 may be formed from a strip of material having two loose ends (not shown) which are joined so as to form a circular loop that can be positioned at or near the sealing area 112. As shown in FIG. 2, the retainer band 200 can be placed directly beneath or behind the O-ring seal 204 around the rim 202 of the bottom half portion 202 of the tank 110. In some embodiments, the retainer band 200 may be appropriately sized to fit the tank 110 so that no attachment or fastening means is required to hold the retainer band 200 in place around the rim 202 of the bottom half portion 202 of the tank 110. In other embodiments, the retainer band may alternatively be installed in the top half portion 100 of the tank 110.

The retainer band 200 may be constructed from metal, but can be made from any other suitable material. It may further be advantageous to construct the retainer band 200 from a strip of metal that is partially or fully resistant to chemical corrosion or rusting, such as stainless steel, to prevent deterioration of the retainer band 200 as it is brought into contact with chemically-charged water during operation of the filter tank 110. In addition, the retainer band 200 should be of sufficient thickness and strength to withstand deformation or breakage as pressure is placed on the retainer band 200 by the clamping assembly 104.

Figure 3A:
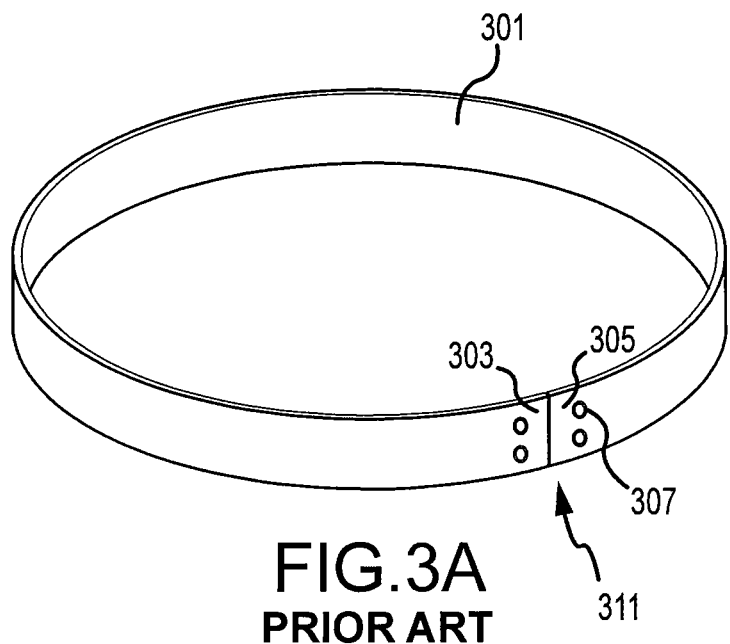
FIG. 3A is an isometric view of a prior art retainer band.
Figure 3B:
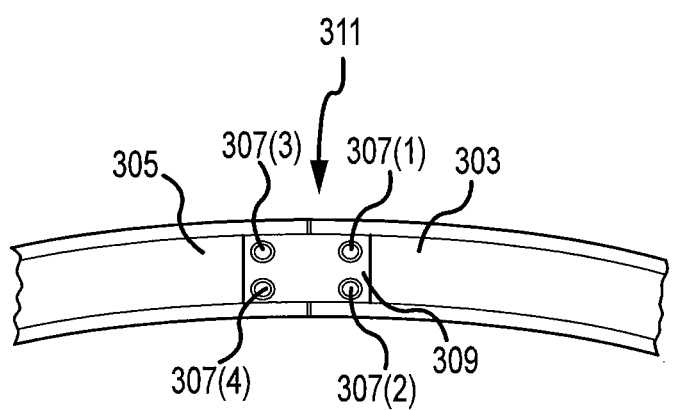
FIG. 3B is an enlarged partial section view of the prior art retainer band shown in FIG. 3A showing the connecting area along an inside wall of the retainer band.

FIGS. 3A-3B illustrate a prior art configuration of a retainer structure. In existing systems, the end portions 303, 305 of the metal band body 301 are often joined by riveting a joining plate 303 (via rivets 307(1)-307(4)) to the end portions 303, 305, or by spot-welding or other weld-fastening means. In other known configurations, the ends of the bands may be directly riveted or welded to one another. However, these connection methods are prone to rapid corrosion and erosion and deterioration of the joint due to stresses, or localized metallurgical changes to the bands during the riveting and welding process (e.g., due to deformation, perforation, and/or heating of the bands), and sometimes through the use of dissimilar metals. This effect is exacerbated in pool filter tanks due to the high concentration of chemicals mixed into pool fluids, leading to separation of the ends of the strip over time as pressure is applied on the joint portion 311 by the clamping assembly.

Figure 4A:
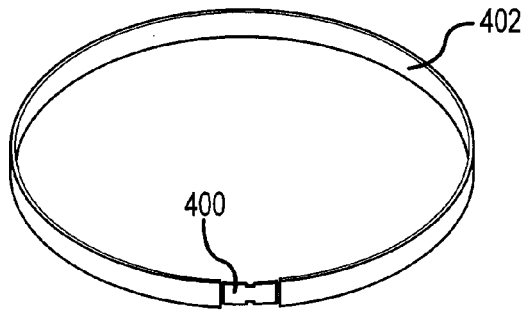
FIG. 4A is an isometric view of the retainer band of an embodiment the retainer structure.
Figure 4B:
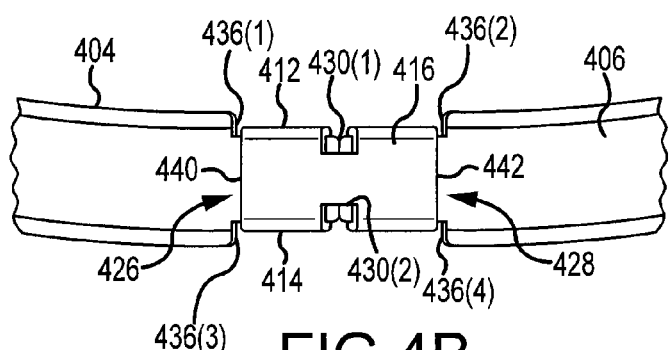
FIG. 4B is a front elevation view of an enlarged partial section of the retainer band shown in FIG. 4A showing the outward-facing surface of the connecting area of the assembled retainer band.
Figure 4C:
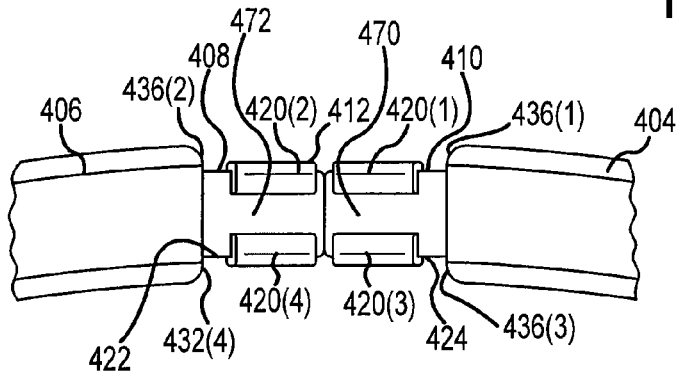
FIG. 4C is a rear elevation view of an enlarged partial section of the retainer band shown in FIG. 4A showing the inward-facing surface of the connecting area of the assembled retainer band.
Figure 4D:
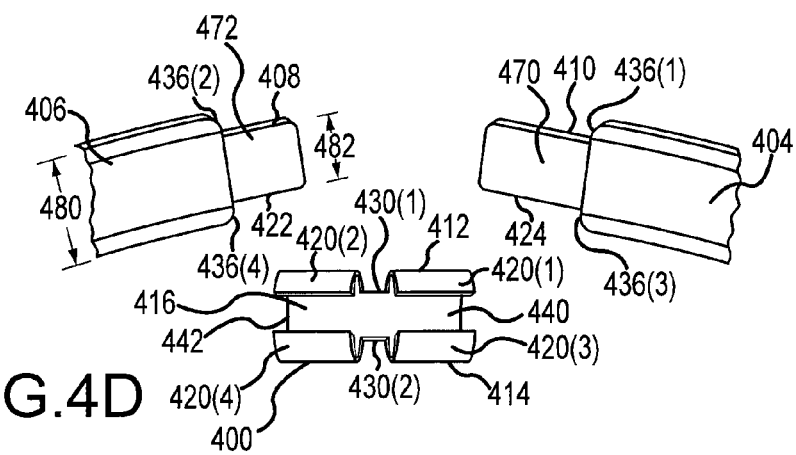
FIG. 4D is an exploded rear isometric view of an enlarged partial section of the retainer band shown in FIG. 4A illustrating the unengaged connecting member as separate from the ends of the band body.

One embodiment of the retainer structure is illustrated in FIGS. 4A-4D. FIG. 4A illustrates an isometric view of the retainer structure. The retainer structure includes a main band body 402, as well as a connecting member 400 for securing the end portions 404, 406 of the band body 402 so that the band body 402 forms a circular or loop shape. More detailed views of the connecting member 400 are shown in FIGS. 4B-4D. As illustrated in FIG. 4B, the band 402 includes two end portions 404, 406 that are slid into opposite receiving ends 440, 442 of the connecting member 400. As shown in FIGS. 4C and 4D, the connecting member 400 includes a back portion 416 that has a top edge 412 and a bottom edge 414 that is parallel to the top edge 412. The connecting member 400 further includes top guiding brackets 420(1), 420(2) extending from the top edge 412 of the connecting member 400, as well as bottom guiding brackets 420(3), 420(4) extending from the bottom edge 414 of the connecting member 400. The top guiding brackets 420(1), 420(2) and the bottom guiding brackets 420(3), 420(4) face each other so as to define two openings 440, 442 for receiving the end portions 404, 406 of the band 420.

FIG. 4C illustrates the end portions 404, 406 of the band body 402 as received and secured by the connecting member 400. As shown in FIG. 4C, the end portions 404, 406 of the band body 402 can be slid into opposite openings 440, 442 of the connecting member 400 along the top and bottom guiding brackets 420(1)-420(4) so that when received, the top guiding brackets 420(1), 420(2) extend from the back portion 416 over the top edges 408, 410 of the end portions 406, 404, and the bottom guiding brackets 420(3)-420(4) extend from the back portion 416 over the bottom edges 422, 424 of the end portions 406, 404. The guiding brackets 420(1)-420(4) can be sized so as to secure the end portions 404, 406 in a close fit or friction fit so that no additional fastening or adhesive means is necessary to secure the ends 404, 406 in the connection member 400. Although the illustrated embodiment shows a connecting member 400 with two sets of top and bottom guiding brackets 420(1)-420(4), other configurations may only have guiding brackets on one edge (e.g., either the top or the bottom edge) of the connecting member, or include more or less guiding bracket portions for receiving and holding the ends of the band.

In the particular embodiment illustrated in FIGS. 4A-4D, both the top edge 412 and the bottom edge 414 of the back portion 416 may include a notched portion 430(1), 430(2) that does not include a guiding bracket extension. The notched portion 430(1), 430(2) may allow for easier bending of the connection member 400 to conform to the curved walls of the tank as the retainer structure is pressed against the interior surface of the tank. In one embodiment, the back portion 416 includes a top notched portion 430(1) and a bottom notched portion 430(2) that are located along a single axis that is perpendicular to the edges 412, 414 of the back portion 416. The notched portions 430(1), 430(2) may be located at a midpoint between the receiving ends 440, 442 of the connecting member 400.

As best illustrated in FIG. 4D, the end portions 404, 406 of the band body 402 may include a constricted or gradually tapered portion 470, 472 that have a width 482 that is less than the width 480 of the rest of the main band body 402. The connecting member 400 may likewise be narrower than the width 440 of the main band body 402. The narrowing of the end portions 404 and 406 creates shoulders 436(1)-436(4)

that interface with the connecting member 400 and prevent the connecting member 400 from sliding past the constricted portions 470, 472 onto the rest of the band body 402 as the end portions 404 and 406 are pressed towards each other when the retainer structure is compressed by the clamping assembly. In addition, the end portions 404, 406 of the band body 402 may also be configured so as to have a smaller thickness than the rest of the main body 402. In other embodiments, the end portions 404, 406 do not have a constricted or tapered portion and are the same width 440 as the rest of the main body 402, so that the butts of the end portions 404, 406 may contact one another in the connecting member 400 when the retainer structure is compressed, thereby preventing the end portions from sliding past each other or overlapping when received in the connecting member.

In one embodiment, the openings in the receiving ends 440, 442 of the connecting member 400 have approximately the same thickness and width as the constricted portions 470, 472 to prevent overlapping or crossing of the received end portions 404, 406 in the connecting member 400. In other embodiments, the openings in the receiving ends 440, 442 may be larger or smaller than the received end portions 404, 406, as appropriate.

Another embodiment of a connecting member 500 similar to the connecting members of FIGS. 4A-4D is illustrated in FIGS. 5A-5F. The back portion 506 of the connecting member 500 may be bent at a hinge line 510 along an axis perpendicular to the top edge 502 and the bottom edge 512 of the connecting member 500. The hinge line 501 may be configured as a bearing connecting the portions 501, 503 of the connecting member 500 separated by the hinge line 501. The hinge line 510 may comprise any type of functional bearing that allows for rotation between the portions 501, 503 separated by the hinge line 510, for example, a pivot hinge, a butt/mortise hinge, a continuous hinge, concealed hinge, a strap hinge, or an H hinge. In addition, the hinge line 510 may be bent at a predefined angle 550 so as to prevent each of the end portions 562, 560 from sliding past the hinge line 510 as the one end portion 562 of the band 502 is pushed toward the other end portion 560 of the band 502 as the band 502 is compressed in the tank. In one embodiment, the back portion 506 of the connecting member 500 may be pressed against the interior wall of the tank (not shown) and the bending angle 550 of the connecting member 500 along the hinge line 510 may conform to the angle of curvature of the interior surface of the tank.

Similar to the embodiment shown in FIGS. 4A-4D, both the top edge 502 and the bottom edge 512 of the back portion 506 may further include a top notched portion 530(1) and a bottom notched portion 530(2) that do not include a guiding bracket extension, and which may allow for easier bending of the connection member 500 at the hinge line 510 to conform to the curved walls of the tank when the retainer structure is inserted. The top notched portion 530(1) and the bottom notched portion 530(2) can be located along a single axis that is perpendicular to the edges 502, 512 of the back portion 506.

As shown in FIG. 5E, the connecting member 500 may be bent along the hinge 510 to bring the guiding brackets 504(1)-504(4) located on opposite sides of the hinge 510 towards one another. Alternatively, in another embodiment illustrated in FIG. 5F, the bottom and top guiding brackets 504(1)-504(2) may be pressed against the interior wall of the tank along the hinge line 510 so that the connecting member 500 is bent away from the direction of extension of the guide brackets 504(1)-504(4).

Figure 6A:
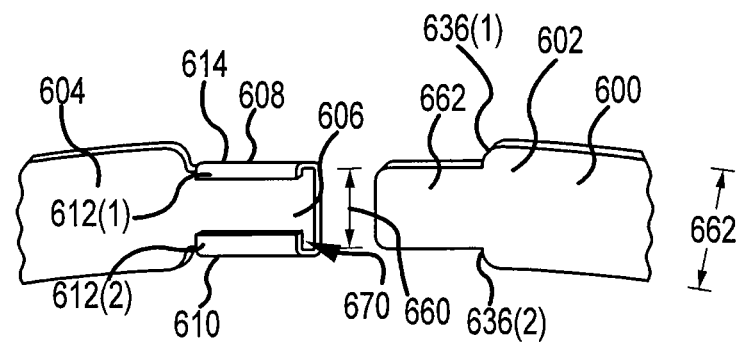
FIG. 6A is a rear isometric view of another embodiment of the retainer band showing the connecting area of the band separated.
Figure 6B:
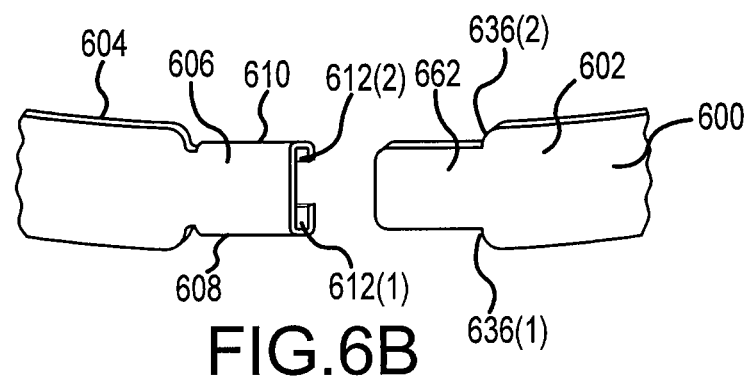
FIG. 6B is a front isometric view of another embodiment of the retainer band showing the connecting area of the band separated.

In another embodiment of the retainer structure illustrated in FIGS. 6A-6E, the end portions 602, 604 of the band body 600 can be configured to interlock so that no additional connection member is needed to secure the ends of the retainer band together. As best shown in FIGS. 6A and 6B, the band body 600 includes a first end portion 604 and a second end portion 602. The first end portion 604 is formed with an engagement structure 614 including a back portion 606 having a top edge 608 and a bottom edge 610. The edges 608, 610 of the back portion 606 can each include extending guiding brackets 612(1), 612(2) that face each other to define an opening 670 for receiving the second end portion 602. The guiding brackets 612(1), 612(2) can be sized so as to slide over the received second end portion 602 to secure the second end portion 602 in a friction fit. In one implementation, the second end portion 602 can include a constricted or gradually tapered portion 662 so that the second end portion 602 has a width 660 that is less than the width 662 of the rest of the main body 600. The narrowed second end portion 602 creates shoulders 636(1), 636(2) that interface with the engagement structure 614. Accordingly, the width of the slot 670 receiving the second end portion 602 may be sized so that the slot 670 is large enough to slidably receive the second end portion 602, but the interface between the shoulders 636(1), 636(2) and the engagement structure 614 prevents the first end portion 604 from sliding beyond the constricted portion 662 of the second end portion 602 onto the rest of the band body 600 when the retainer structure is compressed.

Figure 7:
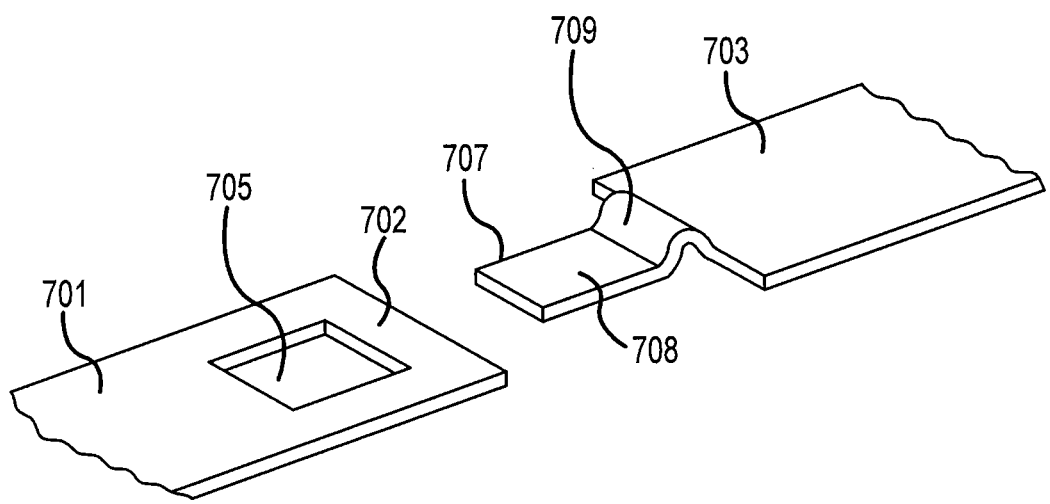
FIG. 7 is an isometric view of a partial section of a further embodiment of a retainer band showing the connecting area of the retainer band.

FIG. 7 illustrates another embodiment of a retainer structure. In this embodiment, the first end portion 701 of the band 703 defines a slot 705 for receiving a locking plate 708 of the second end portion 707 of the band 703. Accordingly, the second end portion 707 is configured as a protrusion or tongue portion with the locking plate 708 at the end that is inserted into the slot 705. In the particular embodiment shown in FIG. 7, the protruding second end portion 707 can also include a hump 709 or raised portion that skirts an end frame segment 702 defining the slot 705, allowing the locking plate 708 to set within the slot 705. The first end portion 701 and the second end portion 707 are thus locked together after the second end portion 707 is inserted into the slot 705 of the first end portion 701.

Figure 8A:
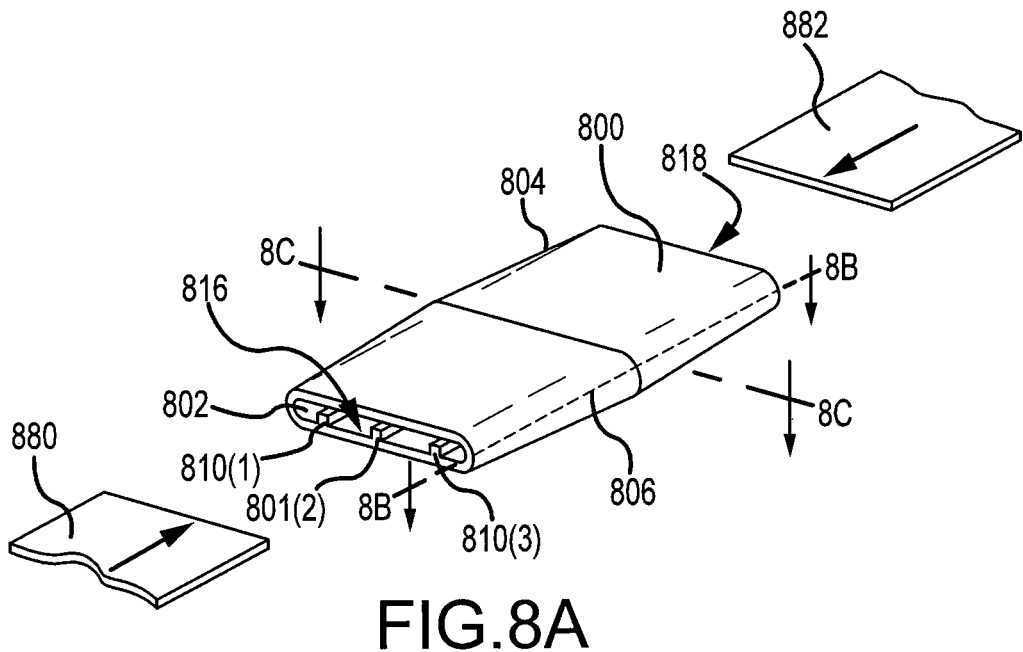
FIG. 8A is an isometric view of yet another embodiment of the connecting member.
Figure 8B:
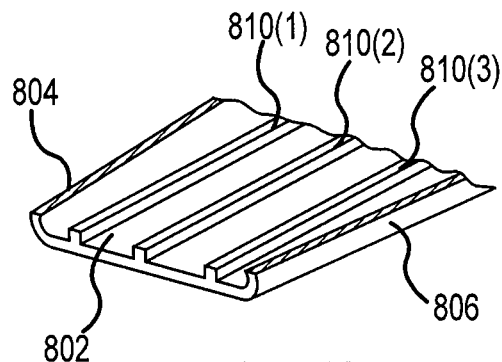
FIG. 8B is an isometric view of a partial section of the connecting member taken along line 8B-8B of FIG. 8A.
Figure 8C:
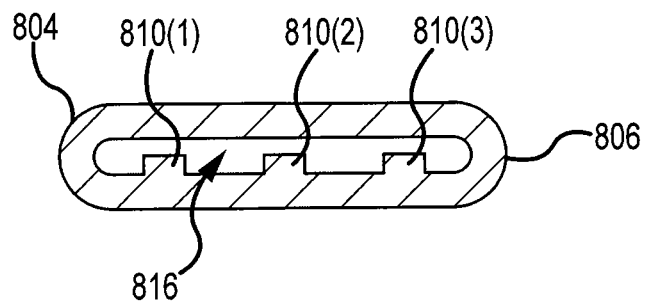
FIG. 8C is a side elevation view in cross section of the connecting member taken along line 8C-8C of FIG. 8A.

As shown in FIGS. 8A-8C, the connection member can be formed as a sleeve structure 800 defining a slot having a first open end 816 and a second open end 818. The connection material may be formed from metal, plastic, or any other material having sufficient rigidity. The first end portion 880 of the band body can be slid through one open end 816 of the sleeve structure 800, while the second end portion 882 of the band body can be slid through the other open end 818 of the sleeve structure 800. Once received, the first end portion 880 may touch the second end portion 882 within the sleeve structure 800. Alternatively, the sleeve structure 800 may define an internal barrier wall (not shown) that prevents contact between the first end portion 880 and the second end portion 882.

In some embodiments, the sleeve structure may have a smooth interior surface that directly contacts the received ends of the of the band. In such embodiments, the operational thickness of the core component may be limited by the thickness of the ends of the band; if the core component is too thin, it becomes susceptible to bending or burning as the molten metal or plastic forming the sleeve structure hardens or sets inside the mold.

In an alternative embodiment, the interior surface 802 of the sleeve structure 800 may include raised or textured portions, such as ribs or ridges 810(1)-810(3) having a flat top surface, which may help prevent deformation of the core component of the mold used to manufacture the sleeve structure 800. In these examples, only the top surfaces of the ridges 810(1)-810(3) contact the received ends of the band. As such, the core component used to manufacture the sleeve structure 800 may have a larger cross-sectional area, thereby reinforcing the structure of the core component and preventing deformation of the core component during the molding process. The raised portions may comprise ridges 810(1)-810(3) that are parallel to the top and bottom edges 804, 806 of the sleeve structure 800, but may be any variety of patterns and/or shapes. In addition, the raised portions may have a flat, curved, pointed or otherwise textured surface. The ridges 810(1)-810(3) may be formed from the same material as the connection member, however, the ridges 810(1)-810(3) may alternatively be formed from another material having high rigidity, or from any suitable shim material to prevent wearing of the sleeve structure 800 during use.

The embodiments illustrated in FIGS. 8A-8C depict a sleeve structure 800 having a smooth exterior surface. However, in other embodiments, as illustrated in FIGS. 9A-9E, the sleeve structure 901 may also have a reinforced exterior surface 903. In one embodiment, the sleeve structure 901 may have parallel raised ridge portions 906(1)-906(10) extending along the top and bottom sides of the sleeve structure 901. The ridge portions 906(1)-906(10) may be slanted and gradually increase in height from openings 911, 912 at opposing ends of the sleeve structure 901 to an approximate midpoint 913 between the openings 911, 912. In addition, the ridge portions 906(1)-906(10) may be separated by flat portions 920 of varying or uniform width. The ridge portions 906(1)-906(10) may serve to reinforce the strength of the exterior surface 903 of the sleeve structure 901 and prevent deformation of the sleeve structure 901 as the band (not shown) is compressed, and may further serve to prevent deformation of the core component used to form the exterior surface 903 of the sleeve structure 901 during the molding process.

Figure 9A:
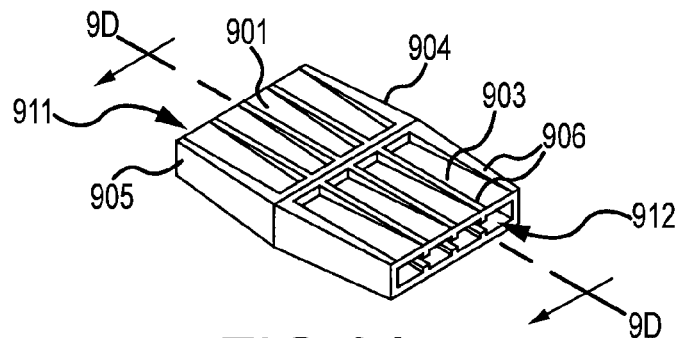
FIG. 9A is an isometric view of an additional embodiment of the connecting member.
Figure 9B:
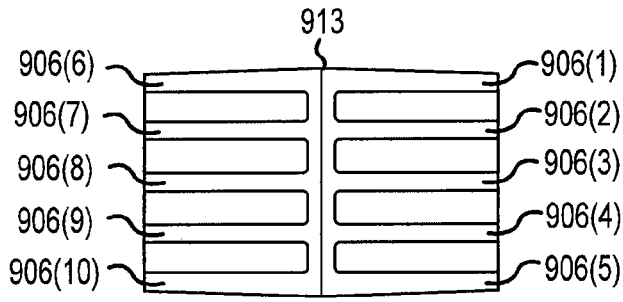
FIG. 9B is a top plan view of the connecting member of FIG. 9A.
Figure 9C:
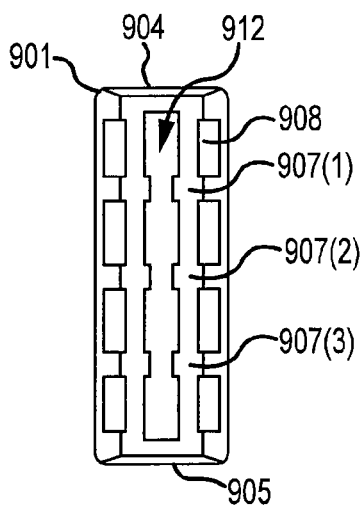
FIG. 9C is a side elevation view of the connecting member of FIG. 9A.
Figure 9D:
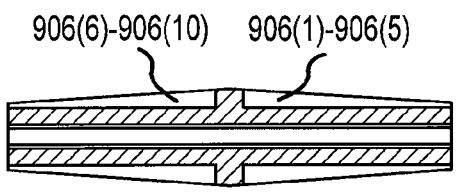
FIG. 9D is a side elevation view in cross section of the connecting member taken along line 9D-9D of FIG. 9A.
Figure 9E:
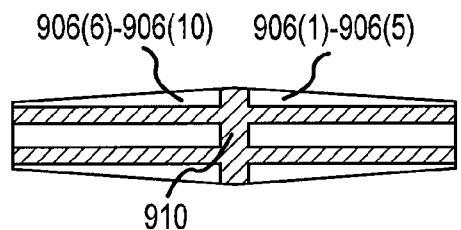
FIG. 9E is a side elevation view in cross section of an alternative configuration of the connecting member of FIG. 9A.

As best seen FIG. 9C, illustrating a side elevation view of the sleeve structure 901 shown in FIG. 9A, and FIG. 9D, the interior surface 908 of the sleeve structure 901 may also have an applied texture, such as ribbing, or raised ridge portions 907(1)-907(3) that are generally parallel to one another. These raised ridge portions 907(1)-907(3) may reinforce the structure of the core component and prevent deformation of the core component during the molding process. The raised ridge portions 907(1)-907(3) may be formed from the same material as the connection member or from a suitable shim material having high rigidity. As shown in FIG. 9E, in an alternative embodiment, the sleeve structure 901 may not have raised ridge portions 907(1)-907(3), but may define an internal barrier wall 910 that prevents contact between a first end portion and a second end portion of the band body. As shown in FIG. 9D, the sleeve structure 901 may not have an internal barrier wall.

As shown in FIGS. 9A-9C, the top and bottom edges 904, 905 of the sleeve structure 901 may be configured as smooth surfaces that flair outward from openings 911, 912 at opposing ends of the sleeve structure 901 to an approximate midpoint 913 between the openings 911, 912. In other embodiments, the top and bottom edges may be flat, rounded and/or textured.

It will be apparent to those of ordinary skill in the art that variations and alternative embodiments may be made given the foregoing description. Such variations and alternative embodiments are accordingly considered within the scope of the present invention.

All directional references (e.g., upper, lower, upward, downward, left, right, leftward, rightward, top, bottom, above, below, inner, outer, vertical, horizontal, clockwise, and counterclockwise) are only used for identification purposes to aid the reader's understanding of the example of the invention, and do not create limitations, particularly as to the position, orientation, or use of the invention unless specifically set forth in the claims. Joinder references (e.g., attached, coupled, connected, joined, and the like) are to be construed broadly and may include intermediate members between a connection of elements and relative movement between elements. As such, joinder references do not necessarily infer that two elements are directly connected and in fixed relation to each other.

In some instances, components are described with reference to "ends" having a particular characteristic and/or being connected with another part. However, those skilled in the art will recognize that the present invention is not limited to components which terminate immediately beyond their points of connection with other parts. Thus, the term "end" should be interpreted broadly, in a manner that includes areas adjacent, rearward, forward of, or otherwise near the terminus of a particular element, link, component, part, member or the like. In methodologies directly or indirectly set forth herein, various steps and operations are described in one possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

I claim:

1. A retainer structure for use in a fluid-holding tank, the retainer structure comprising
    a main band body having a first end portion with a gradually tapered end and a second end portion with a second gradually tapered end, the tapered ends having a width that is less than a width of the main band body; and
    a preformed connecting member receivingly engaged with the first and second end portions so that the main band body forms a loop shape, the connecting member having a width that is less than the width of the main band body and greater than the width of the tapered ends,
    wherein the connecting member directly secures the received first and second end portions without deforming the first and second end portions.

2. The retainer structure recited in claim 1, wherein the main band body is a strip of metal.

3. The retainer structure recited in claim 1, wherein the connecting member is metal.

4. The retainer structure recited in claim 3, wherein the connecting member is stainless steel.

5. The retainer structure recited in claim 1, wherein the connecting member is plastic.

6. The retainer structure recited in claim 1, wherein the connecting member directly secures the received first and second end portions in a friction fit.

7. The retainer structure recited in claim 6, wherein
    the connecting member is a sleeve structure defining a slot having a first open end and a second open end, and
    the first end portion is slidably received through the first open end of the slot and the second end portion is slidably received through the second open end of the slot.

8. The retainer structure recited in claim 7, wherein the received first and second end portions are in physical contact within the sleeve structure.

9. The retainer structure recited in claim 7, wherein
the sleeve structure has an exterior surface and an interior surface, and
at least one of the exterior surface and the interior surface is substantially smooth.

10. The retainer structure recited in claim 7, wherein
the sleeve structure has an exterior surface and an interior surface, and
at least one of the exterior surface and the interior surface is textured.

11. The retainer structure recited in claim 7, wherein the interior surface of the sleeve structure has raised ridge portions for preventing sliding of the received first and second end portions in the sleeve structure.

12. The retainer structure recited in claim 7, wherein
the first and second end portions are received so that a first edge of the first end portion and a second edge of the second end portion both line a top edge of the slot;
a third edge of the first end portion distal from the first edge and a fourth edge of the second end portion distal from the second edge line a bottom edge of the slot;
the top edge of the slot is parallel to the bottom edge of the slot; and
a distance from the bottom edge of the slot to the top edge of the slot is approximately equal to a distance from the first edge to the third edge of the first end portion and a distance from the second edge to the fourth edge of the second end portion.

13. The retainer structure recited in claim 12, wherein the first and second end portions each have a constricted portion and one or more shoulders that engage with the sleeve structure and prevent the sleeve structure from sliding past the constricted portion as the retainer structure is compressed.

14. The retainer structure recited in claim 2, wherein the connecting member further comprises
a back portion having a first edge and a second edge that is parallel to the first edge;
a first guiding bracket extending from at least a portion of the first received edge of the back portion; and
a second guiding bracket extending from at least a portion of the second edge of the back portion; and
wherein the first guiding bracket and the second guiding bracket face one another to define a first opening for slidably receiving the first and second end portions along a first surface of the back portion.

15. The retainer structure recited in claim 14, wherein the back portion is bendable at a hinged portion along an axis perpendicular to the first and second edges of the back portion.

16. The retainer structure recited in claim 15, wherein the hinged portion prevents the first and second end portions from sliding past the hinged portion as the retainer structure is compressed.

17. The retainer structure recited in claim 1, wherein
the fluid-holding tank has an interior surface; and
the retainer structure is configured so as to line a portion of the interior surface of the tank.

18. The retainer structure of claim 1, wherein the connecting member comprises a notched portion located at a midpoint of the connecting member, the notched portion having a top notched portion and a bottom notched portion, and a width between the top notched portion and the bottom notched portion is less than a width of the main band body, and wherein the ends of the main band body are at least partially exposed within the notched portion.

* * * * *